United States Patent
Tabata et al.

(10) Patent No.: US 9,682,697 B2
(45) Date of Patent: Jun. 20, 2017

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Atsushi Tabata, Okazaki (JP); Toshiki Kanada, Toyota (JP); Tatsuya Imamura, Okazaki (JP); Isao Satou, Nagoya (JP); Kazuyuki Shiiba, Miyoshi (JP); Tooru Matsubara, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/903,829

(22) PCT Filed: Aug. 2, 2013

(86) PCT No.: PCT/JP2013/071071
§ 371 (c)(1),
(2) Date: Jan. 8, 2016

(87) PCT Pub. No.: WO2015/004817
PCT Pub. Date: Jan. 15, 2015

(65) Prior Publication Data
US 2016/0152227 A1 Jun. 2, 2016

(30) Foreign Application Priority Data

Jul. 11, 2013 (JP) ................. 2013-145397

(51) Int. Cl.
*B60W 20/19* (2016.01)
*B60W 10/08* (2006.01)
(Continued)

(52) U.S. Cl.
CPC ............ *B60W 20/19* (2016.01); *B60K 6/442* (2013.01); *B60K 6/445* (2013.01); *B60W 10/06* (2013.01);
(Continued)

(58) Field of Classification Search
None
See application file for complete search history.

(56) References Cited

U.S. PATENT DOCUMENTS

| | | | |
|---|---|---|---|
| 2006/0011395 A1* | 1/2006 | Sugiyama ............ | B60K 6/365 180/65.235 |
| 2006/0063629 A1* | 3/2006 | Minagawa ............ | B60K 6/365 475/5 |

(Continued)

FOREIGN PATENT DOCUMENTS

| | | |
|---|---|---|
| CN | 103189258 A | 7/2013 |
| JP | 2008-265598 A | 11/2008 |

(Continued)

*Primary Examiner* — Russell Frejd
(74) *Attorney, Agent, or Firm* — Andrews Kurth Kenyon LLP

(57) ABSTRACT

A control system for a hybrid vehicle having an engine and motors is provided. The control system is configured to select an operating mode of the vehicle from a first operating mode in which the vehicle is powered by the engine, a second operating mode in which the vehicle is powered by two motors, and a third operating mode in which the vehicle is powered by the motor of the smaller number. The control system does not select the second operating mode when a required driving force is changed at rate greater than a predetermined value.

9 Claims, 11 Drawing Sheets

(51) Int. Cl.
  *B60W 10/06*    (2006.01)
  *B60W 30/182*   (2012.01)
  *B60K 6/445*    (2007.10)
  *B60K 6/442*    (2007.10)

(52) U.S. Cl.
  CPC .......... *B60W 10/08* (2013.01); *B60W 30/182* (2013.01); *B60W 2520/10* (2013.01); *B60W 2540/106* (2013.01); *B60W 2710/0666* (2013.01); *B60W 2710/083* (2013.01); *B60W 2720/40* (2013.01); *Y02T 10/6234* (2013.01); *Y02T 10/6239* (2013.01); *Y02T 10/7258* (2013.01); *Y10S 903/91* (2013.01); *Y10S 903/93* (2013.01)

(56) References Cited

U.S. PATENT DOCUMENTS

| | | | | |
|---|---|---|---|---|
| 2008/0228334 | A1* | 9/2008 | Hashimoto | B60K 6/365 701/22 |
| 2008/0258474 | A1* | 10/2008 | Tabata | B60K 6/365 290/40 A |
| 2008/0318726 | A1* | 12/2008 | Matsubara | B60K 6/365 477/3 |
| 2010/0203996 | A1* | 8/2010 | Kawai | B60K 6/445 475/5 |
| 2012/0072064 | A1* | 3/2012 | Kumazaki | F16H 61/0213 701/22 |
| 2012/0265387 | A1  | 10/2012 | Hisada et al. | |
| 2012/0271526 | A1* | 10/2012 | Oishi | B60T 7/042 701/99 |
| 2013/0218394 | A1  | 8/2013 | Kanayama et al. | |
| 2014/0011618 | A1  | 1/2014 | Atarashi et al. | |
| 2014/0323265 | A1* | 10/2014 | Maruyama | B60W 50/16 477/3 |

FOREIGN PATENT DOCUMENTS

| | | |
|---|---|---|
| JP | 2012-224148 A | 11/2012 |
| JP | 2013-121837 A | 6/2013 |
| WO | 2012/059996 A1 | 5/2012 |
| WO | 2012/169410 A1 | 12/2012 |

* cited by examiner

|    |          |                     |                | CO | BO | MG1 | MG2 |
|----|----------|---------------------|----------------|----|----|-----|-----|
| EV | Forward/ Backward | Single-Motor Mode | Drive          |    |    | G   | M   |
|    |          |                     | Engine Braking | △  | △  | G   | M   |
|    |          | Dual-Motor Mode     |                | ○  | ○  | M   | M   |
| HV | Forward  | High                |                |    | ○  | G   | M   |
|    |          | Low                 |                | ○  |    | G   | M   |
|    | Backward | Low                 |                | ○  |    | G   | M   |

○: Engaged    △: Selectively Engaged to Apply Engine Braked
G: Mainly Generator    M: Mainly Motor but Generator at Re-generation

CONTROL SYSTEM FOR HYBRID VEHICLE

CROSS-REFERENCE TO RELATED APPLICATIONS

This is a national phase application based on the PCT International Patent Application No. PCT/JP2013/071071 filed Aug. 2, 2013, claiming priority to Japanese Patent Application No. 2013-145397 filed Jul. 11, 2013, the entire contents of both of which are incorporated herein by reference.

TECHNICAL FIELD

The present invention relates generally to a control system for a hybrid vehicle in which an engine and a motor-generator serve as a prime mover, and especially to a control system configured to shift an operating mode of a hybrid vehicle.

BACKGROUND ART

In hybrid vehicles, an electric motor or a motor-generator (as will be simply called a "motor" hereinafter) is used as a prime mover together with an engine, and an operating mode can be selected from a various kinds of modes. For example, Japanese Patent Laid-Open No. 2008-265598 describes a two-motor type hybrid drive unit having a motor/generator for controlling an engine speed and a motor activated by a power generated by the motor-generator. According to the teachings of Japanese Patent Laid-Open No. 2008-265598, the engine and the motor/generator are connected to a power distribution device having three rotary elements, and the motor is connected to an output element of the power distribution device to deliver an electric power thereto from the motor-generator. the output element is also connected to driving wheels through a gear train, and an output shaft of the engine is halted by a halting means.

That is, the output element of the power distribution device is subjected to a negative torque resulting from rotating the driving wheel. In this situation, the engine speed is changed in accordance with a speed of the motor-generator by operating the engine while activating the motor-generator to generate power. Consequently, the hybrid vehicle is allowed to be propelled in an optimally fuel efficient manner. In this situation, the electric power generated by the motor-generator is delivered to the motor, and a power generated by the motor is delivered to the driving wheels through the output element. That is, the hybrid vehicle is propelled under engine mode (or hybrid mode). According to the teachings of Japanese Patent Laid-Open No. 2008-265598, the hybrid vehicle is also allowed to be propelled under motor mode. In the motor mode, the output shaft of the engine is halted by the halting means so that the power distribution device may serve as a speed change device. Consequently, an input element of the power distribution device is halted so that torque of the motor/generator can be outputted from the output element while being increased or decreased in accordance with a gear ratio of the power distribution device. As a result, the driving wheels are rotated by driving forces of the motor and the motor-generator.

Thus, according to the teachings of Japanese Patent Laid-Open No. 2008-265598, operating mode of the hybrid vehicle can be selected from the engine mode and the motor mode, and hence fuel efficiency can be improved by efficiently activating the motor by a regenerative energy. That is, a prime move can be selected in accordance with a required driving force based on an opening degree of an accelerator changed by a driver's operation. In addition, if the required driving force is small, the vehicle may also be propelled by any one of the motors to further improve the energy efficiency.

The operating mode of the hybrid vehicle is selected from those two or three modes in accordance with an opening degree of the accelerator and a vehicle speed. For example, if the vehicle is propelled at a predetermined speed by opening the accelerator widely, the engine mode is selected. By contrast, if the opening degree of the accelerator is small, the motor mode is selected to propel the vehicle by both motors, and if the opening degree of the accelerator is further small, the vehicle is propelled by any one of the motors. That is, the operating mode is shifted in response to a change in the opening degree of the accelerator or a required driving force. Therefore, when the accelerator pedal is depressed or returned abruptly, the operating mode is shifted suddenly. In this case, in the hybrid vehicle taught by Japanese Patent Laid-Open No. 2008-265598, the operating mode can be selected from the above-explained three modes. However, if the operating mode is shifted only in response to a change in the opening degree of the accelerator, the operating mode may be shifted immediately across two modes. In those operating modes, an interim mode is merely a temporary mode during a shifting operation, however, operating states of the motors and engagement states have to be changed even when shifting the operating mode to such an interim mode. For this reason, a longer time is required to shift the operating mode, and a driver may feel discomfort resulting from a change in the driving force caused by the shifting operation.

DISCLOSURE OF THE INVENTION

The present invention has been conceived noting the foregoing technical problem, and it is therefore an object of the present invention is to provide a control system for hybrid vehicles configured to prevent frequent occurrence of a shifting operation of an operating mode even if a required driving force is changed abruptly.

The control system according to the present invention is applied to a hybrid vehicle in which a prime mover for generating a driving force to propel the vehicle includes an engine and at least two motors, and configured to select an operating mode of the vehicle in accordance with a required driving force from a first operating mode in which the vehicle is powered by the engine, a second operating mode in which the vehicle is powered by at least two motors, and a third operating mode in which the vehicle is powered by the motor of the smaller number than that under the second operating mode. In order to achieve the above-explained objective, according to the present invention, the control system is further configured to not to select the second operating mode if a change rate of the required driving force is greater than a predetermined value.

The required driving force may be calculated based on an opening degree of an accelerator and a vehicle speed.

The change rate of the required driving force may include a change rate of the opening degree of the accelerator.

The control system is further configured to define an operating region of the vehicle based on the required driving force and the vehicle speed into a first region where the first operating mode is selected, a second region where the required driving force is smaller than that within the first region and hence the second operating mode is selected, and a third region where the required driving force is smaller than that within the second region and hence the third operating mode is selected. In addition, control system is further configured to select the operating mode from the first region to the third region upon entrance of an operating point of the vehicle determined based on the required driving force and the vehicle speed.

The control system may select the first operating mode even if the operating point enters into the second region by expanding the first region to cover the second region.

The control system may select the first operating mode instead of the second operating mode even if the operating point enters into the second region.

The above-mentioned two motors includes a first motor adapted to deliver a driving force to the engine and driving wheels, and a second motor adapted to deliver a driving force at least to the driving wheels.

Specifically, the hybrid vehicle comprises: a power distribution device adapted to perform a differential action among first to third rotary elements, in which a first rotary element is connected to the engine, a second rotary member is connected to the first motor, and a third rotary member is connected to the second motor; and a halting means that halts and releases the first rotary element.

In addition, one of the above-mentioned motors includes a motor having a generating function.

Thus, according to the present invention, the operating mode is shifted between the engine mode and the motor mode depending on the required driving force. For this reason, fuel efficiency or energy efficiency can be improved while achieving the required driving force. In addition, if the required driving force is changed at a rate greater than the predetermined value, the operating mode is shifted between the first operating mode and the third operating mode while skipping the second mode. For this reason, frequency of shifting operation of the operating mode over a plurality of the operating modes can be reduced.

DETAILED DESCRIPTION OF THE PREFERRED EMBODIMENT(S)

The control system of the present invention is applied to a powertrain of a vehicle in which a prime mover includes an engine and a motor or a motor-generator (as will be simply called "the motor" hereinafter). Specifically, the control system of the present invention is applied to a powertrain of a hybrid vehicle having at least a motor adapted to control a torque and a speed of an engine, and a motor adapted to generate power. The control system of the present invention may be applied to any types of hybrid vehicles such as a series hybrid vehicle, a parallel hybrid vehicle and a series/parallel hybrid vehicle. In the vehicles of those kinds, not only a gasoline engine but also a diesel engine and a gas engine may be used. In addition, it is preferable to use at least one motor having a generating function (such as the motor-generator), but the other motor is not necessarily to generate an electric power.

In the hybrid vehicle to which the control system is applied, an operating mode can be selected from a mode in which the vehicle is powered by the engine, and a mode in which the vehicle is powered by an electric power stored in a battery. Specifically, the operating mode for propelling the vehicle by the engine power can be selected from a mode in which the engine power is partially delivered to driving wheels while operating the motor-generator by the remaining power to generate an electric power for operating the other motor, and a mode in which the engine is used to activate a generator to propel the vehicle by the motor activated by an electric power generated by the generator. Meanwhile, the driving mode for propelling the vehicle by the electric power can be selected from a mode in which the vehicle is power by one of the motors, and a mode in which the vehicle is power by both motors.

Figure 3:
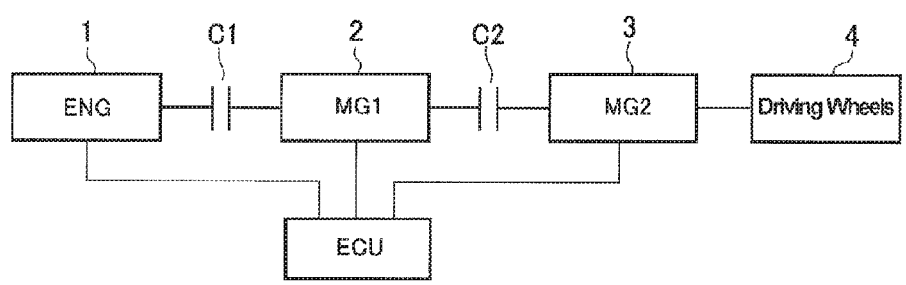
FIG. 3 is a block diagram showing one example of a powertrain of the hybrid vehicle to which the present invention is applied.

Referring now to FIG. 3, there is shown one example of a powertrain of the hybrid vehicle. In the example shown in FIG. 3, an engine (ENG) 1 and two motor-generators (MG1, MG2) 2, 3 are arranged in tandem. Specifically, an output shaft of the engine 1 is connected to a rotor of the first motor-generator (MG1) 2 through a first clutch C1, and the rotor of the first motor-generator (MG1) 2 is connected to a rotor of the second motor-generator (MG2) 3 through a second clutch C2. Driving wheels 4 are rotated by a power delivered from the rotor of the second motor-generator (MG2) 3. A fuel delivery amount to the engine 1, an ignition timing, an opening degree of a throttle valve, a timing to open/close valves etc. are controlled electrically. Although not especially shown, the motor-generators 2 and 3 are individually connected to the battery through an inverter (not shown) so that rotational speeds and torques thereof are controlled electrically, and that the motor-generators 2 and 3 are switched electrically between a motor and a generator. In addition, activation and a torque transmitting capacity of each clutch C1 and C2 are also controlled electrically. To this end, the engine 1, and the motor-generators 2 and 3 are individually connected to an electronic control unit (abbreviated as ECU hereinafter).

Thus, the prime mover includes the engine 1 and the motor-generators 2 and 3, and a power range and output characteristics of each power unit differ from one another. For example, a torque range and a speed range of the engine 1 are widest in those power units, and an energy efficiency thereof is optimized in a higher range. In turn, the first motor generator 2 is used to control a speed of the engine 1 and a crank angle for stopping the engine 1. To this end, the first motor generator 2 is adapted to output large torque in a low speed region. Meanwhile, the second motor-generator 3 is used to apply torque to the driving wheels 4. To this end, the second motor-generator 3 is allowed to be rotated at higher speed than the first motor generator 2, and a maximum torque of the second motor-generator 3 is smaller than that of the first motor generator 2. Therefore, the control system of the present invention is configured to improve the energy efficiency and the fuel economy by efficiently controlling the prime mover such as the engine 1 and the motor-generators 2 and 3.

Figure 4:
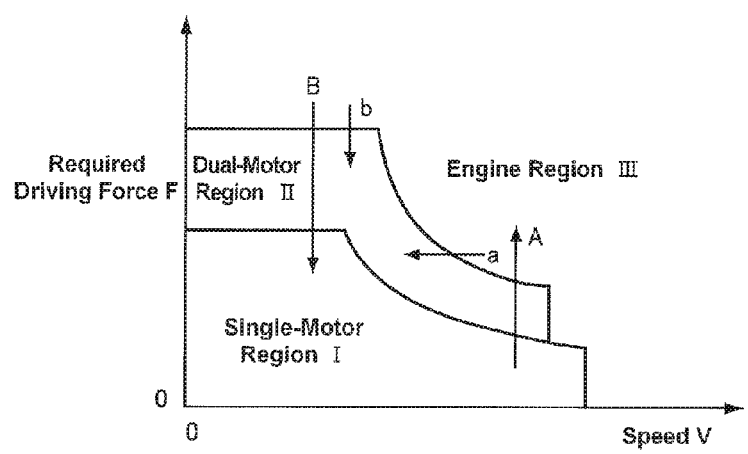
FIG. 4 is a map (diagram) defining regions of the engine mode, the dual-motor mode, and the single-motor mode.

In the preferred example, an operating mode of the vehicle is selected from engine mode where the vehicle is propelled by a power of the engine 1, dual-motor mode where the vehicle is propelled by operating both of the motor-generators 2 and 3 as motors, and single-motor mode where the vehicle is propelled by a power of any one of motor-generators 2 and 3 (specifically, by the second motor-generator 3). Operating regions of those driving modes are schematically shown in FIG. 4 where a horizontal axis represents a vehicle speed V and a longitudinal axis represents a required driving force E In FIG. 4, the region I is a single-motor region where the single-motor mode as the claimed third operating mode is selected, the region II is a dual-motor region where the dual-motor mode as the claimed second operating mode is selected, and the region III is an engine region where the engine mode as the claimed first operating mode is selected.

For example, as the case of controlling the engine and the motor-generator(s) in the conventional hybrid vehicle, the required driving force F is calculated based on an opening degree of an accelerator and a vehicle speed. Here, the calculation value of the driving force may be adjusted depending on a grade or a class of the vehicle to achieve a required drive performance and drive characteristics. In the preferred examples, any of the required driving force F, the opening degree of the accelerator, and a parameter determined based on those factors may be employed as a target power.

According to the preferred examples, therefore, the engine mode is selected provided that the opening degree of the accelerator is larger than a predetermined angle, or that the vehicle speed is higher than a predetermined speed. Under the engine mode, specifically, the engine 1 is operated in such a manner to achieve the required driving force F and both of the clutches C1 and C2 are brought into engagement to deliver torque generated by the engine 1 to the driving wheels 4 through the motor-generators 2 and 3. In this situation, the torque and the rotational speed of the engine 1 are controlled e.g., by the first motor-generator 2, and if an electric power is generated by the first motor-generator 2 in consequence, the second motor-generator 3 is operated by the electric power thus generated. Accordingly, the engine mode may also be called a hybrid mode.

By contrast, if the opening degree of the accelerator is small and the required driving force F is therefore small, an operating point of the vehicle falls within the single-motor region I. In this case, the engine 1 is stopped and at least the second clutch C2 is brought into disengagement. In this situation, the second motor-generator 3 is operated as a motor by supplying the electric power from the battery so that the vehicle is propelled by the second motor-generator 3. Optionally, the crank angle may be adjusted by the first motor-generator 2 to a suitable angle for a preparation of restarting the engine 1.

Then, when the required driving force F is increased and hence the operating point is shifted within the dual-motor region II between the single-motor region I and the engine region III, the engine 1 is also stopped, and the first clutch C1 is brought into disengagement and the second clutch C2 is brought into engagement. In this situation, both of the motor-generators 2 and 3 are operated as motors by supplying the electric power thereto from the battery. Specifically, the single-motor mode and the dual-motor mode are permitted to be selected under the conditions that a state of charge (abbreviated as SOC hereinafter) of the battery is sufficient, that the second motor-generator 3 is in condition to generate torque, and that the engine 1 is allowed to be stopped.

During propulsion of the vehicle, the accelerator is operated to address changes in a road gradient, a traffic, a speed limit and so on, and hence a vehicle speed is changed in response to changes in those factors. Consequently, the operating mode of the vehicle is shifted. For example, if the vehicle speed V is lowered during propelling the vehicle by the engine 1, the operating point of the vehicle is shifted from the engine region III to the dual-motor region II or the single-motor region I as indicated by the arrow "a" in FIG. 4. Likewise, when an opening degree of the accelerator is reduced, the operating point of the vehicle is also shifted from the engine region III to the dual-motor region II or the single-motor region I as indicated by the arrow "b" in FIG. 4. Given that the crank angle of the engine 1 is optimized in such a manner to restart the engine 1 by the first motor generator 2 and that the operating point is shifted from the engine region III to the dual-motor region II, the operating mode of the vehicle is temporarily shifted to the single-motor mode and then shifted to the dual-motor mode by operating the first motor-generator 2 in such a manner to generate a driving force for propelling the vehicle. Those shifting operations of the operating mode in response to a change in the operating point are carried out by the aforementioned electronic control unit ECU.

Figure 5:
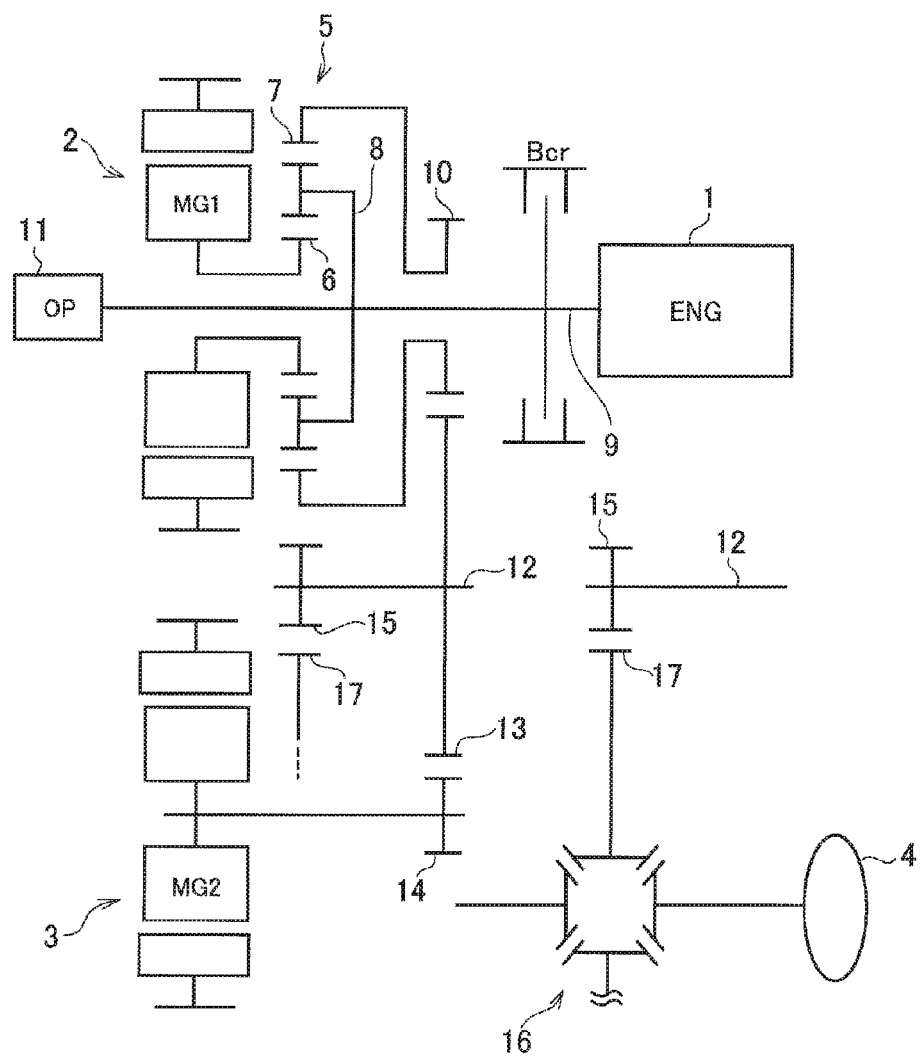
FIG. 5 is a skeleton diagram showing another example of a powertrain of the hybrid vehicle to which the present invention is applied.

Turning to FIG. 5, there is shown another example of power train to which the control system of the present invention is applied. In the example shown in FIG. 5, a power of the engine 1 is distributed to the first motor-generator 2 side and the driving wheels 4 side, and the second motor-generator 3 is operated by the electric power generated by the first motor-generator 2 so that the driving wheels 4 is driven by the power of the second motor-generator 3. That is, so-called a "two-motor type", or a "series/parallel type" hybrid drive unit is shown in FIG. 5. In this example, a single-pinion type planetary gear unit is disposed coaxially with the engine 1 to serve as a power distribution device 5. Specifically, the power distribution device 5 is adapted to perform a differential action among three rotary elements, and a sun gear 6 is connected with a rotor of the first motor-generator 2 disposed in the opposite side of the engine 1 across the power distribution device 5. A ring gear 7 is arranged concentrically with the sun gear 6, and pinion gears interposed between the sun gear 6 and the ring gear 7 while meshing therewith are supported by a carrier 8 while being allowed to rotate and revolve around the sun gear 6. The carrier 8 is connected with an output shaft 9 of the engine 1, and the ring gear 7 is connected with a drive gear 10 disposed between the engine 1 and the power distribution device 5. Thus, the carrier 8 serves as an input element of the power distribution device 5, and a brake Bcr is disposed between the drive gear 10 and the engine 1 so as to halt a rotation of the carrier 8. That is, since the carrier 8 is connected to the output shaft 9 of the engine 1, the brake Bcr halts a rotation of the engine 1. For example, a friction clutch or a dog clutch hydraulically brought into engagement may be used as the brake Bcr. Accordingly, the brake Bcr serves as an engagement device of the present invention.

In order to lubricate the power distribution device 5, and to hydraulically control the power distribution device 5, an oil pump (OP) 11 is also connected with the output shaft 9 on the other side of the engine 1 to be driven by the engine 1.

A counter shaft 12 is arranged parallel to a common rotational center axis of the power distribution device 5 and the first motor-generator 2, and a counter driven gear 13 meshing with the drive gear 10 is fitted onto the counter shaft 12 to be rotated integrally therewith. A diameter of the counter driven gear 13 is larger than that of the drive gear 10 so that a rotational speed is reduced, that is, torque is multiplied during transmitting the torque from the power distribution device 5 to the counter shaft 12.

The second motor-generator 3 is arranged parallel to the counter shaft 12 so that torque thereof may be added to the torque transmitted from the power distribution device 5 to the driving wheels 4. To this end, a reduction gear 14 connected with a rotor of the second motor-generator 3 is meshed with the counter driven gear 13. A diameter of the reduction gear 14 is smaller than that of the counter driven gear 13 so that the torque of the second motor-generator 3 is transmitted to the counter driven gear 13 or the counter shaft 12 while being multiplied. According to such arrangement, a speed reduction ratio between the reduction gear 14 and the counter driven gear 13 can be increased, and mountability of the power train on a front-engine/front-drive vehicle can be improved.

In addition, a counter drive gear 15 is fitted onto the counter shaft 12 in such a manner to be rotated integrally therewith, and the counter drive gear 15 is meshed with a ring gear 17 of a differential gear unit 16 serving as a final reduction device. In FIG. 5, however, a position of the differential gear unit 16 is displaced to the right side for the convenience of illustration.

In the power train shown in FIG. 5, each motor-generator 2 and 3 is also connected individually with an electric storage device such as a battery through a not shown controller such as an inverter. Therefore, those motor-generators 2 and 3 are individually switched between a motor and a generator by controlling a current applied thereto. Meanwhile, an ignition timing of the engine 1 and an opening degree of the throttle valve are controlled electrically, and the engine 1 is stopped and restarted automatically.

Figure 6:
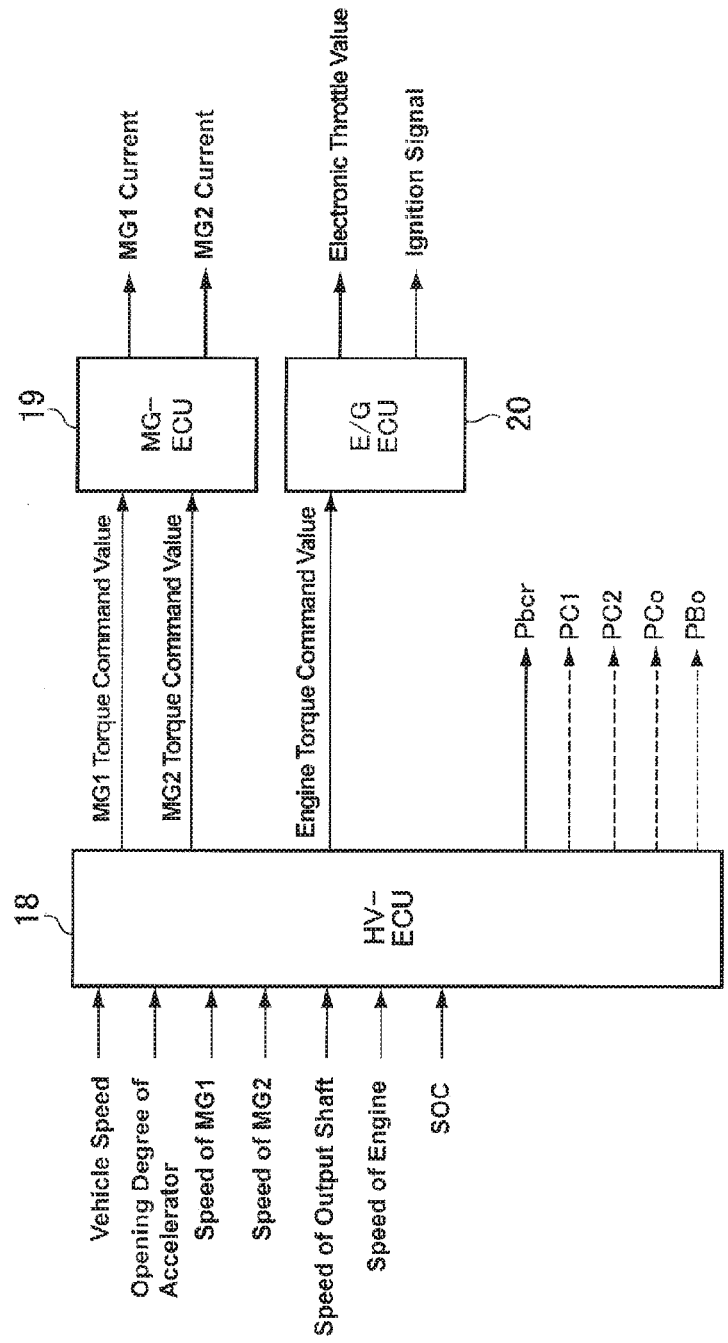
FIG. 6 is a block diagram schematically showing a control system according to the present invention.

Those controls are executed by an electronic control unit, and a control system according to the preferred example is shown in FIG. 6. The control system is comprised of a hybrid control unit (HV-ECU) 18 for entirely controlling a running condition of the vehicle, a motor-generator control unit (MG-ECU) 19 for controlling the motor-generators 2 and 3, and an engine control unit (E/G-ECU) 20 for controlling the engine 1. Each control unit 18, 19 and 20 are individually composed mainly of a microcomputer configured to carry out a calculation based on input data and preinstalled data, and to output a calculation result in the form of a command signal. For example, a vehicle speed, an opening degree of the accelerator, a speed of the first motor-generator 2, a speed of the second motor-generator 3, a speed of the ring gear 7 (i.e., an output shaft speed), a speed of the engine 1, an SOC of the battery and so on are sent to the HV-ECU 18. Meanwhile, the HV-ECU 18 is configured to output a torque command for the first motor-generator 2, a torque command for the second motor-generator 3, a torque command for the engine 1, a hydraulic command for the brake Bcr and so on. Given that the control system is applied to the power train shown in FIG. 3, the HV-ECU 18 optionally outputs a hydraulic command PC1 for the first clutch C1 and a hydraulic command PC2 for the second clutch C2. Further, the HV-ECU 18 additionally outputs a hydraulic command PC0 for an after-mentioned clutch C0 of a transmission unit 22, and a hydraulic command PB0 for an after-mentioned brake B0.

The torque command for the first motor-generator 2 and the torque command for the second motor-generator 3 are sent to the MG-ECU 19, and the MG-ECU 19 calculates current commands to be sent individually to the first motor-generator 2 and the second motor-generator 3 using those input data. Meanwhile, the torque command for the engine 1 is sent to the E/G-ECU 20, and the E/G-ECU 20 calculates a command to control an opening degree of the throttle valve and a command to control an ignition timing using those input data, and the calculated command values are individually sent to an electronic throttle valve and ignition device (not shown).

Figure 7:
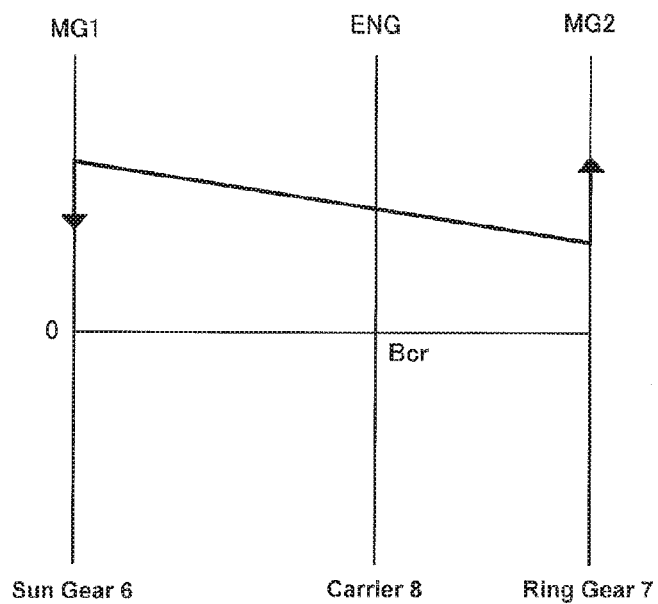
FIG. 7 is a nomographic diagram showing a state of the power distribution device of the power train shown in FIG. 5 under a condition that the vehicle is powered by the engine.
Figure 8:
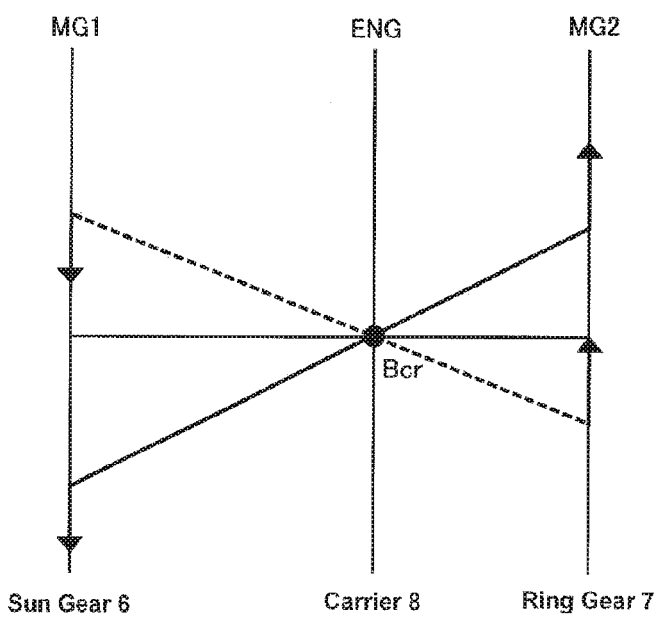
FIG. 8 is a nomographic diagram showing a state of the power distribution device of the power train shown in FIG. 5 under a condition that the vehicle is powered by the motor-generator.

In the vehicle having the powertrain shown in FIG. 5, the operating mode may also be selected from the above-explained engine mode, dual-motor mode and single-motor mode. Torques and rotational speeds under each driving mode are shown in FIGS. 7 and 8. Under the engine mode, the engine 1 is operated in such a manner to generate a power possible to achieve the required driving force while producing optimal fuel consumption. FIG. 7 is a nomographic diagram of the power distribution device 5. As can be seen from FIG. 7, under the engine mode, the torque of the engine 1 is applied to the carrier 8, and a resistance torque is applied to the ring gear 7. In this situation, if a negative torque (i.e., a reaction torque) of the first motor-generator 2 is applied to the sun gear 6 (that is, in the direction opposite to the direction of the engine torque), a torque of the ring gear 7 functioning as an output element is increased (in the forward direction). Given that the first motor-generator 2 is rotated in the forward direction (i.e., in the same direction as the engine 1), such negative torque of the first motor-generator 2 is generated by operating the first motor-generator 2 as a generator. Consequently, an electric power is generated by the first motor-generator 2, and the electric power thus generated is delivered to the second motor-generator 3 to operate the second motor-generator 3 as a motor. The torque generated by the second motor-generator 3 is added to the torque generated by the engine 1 and transmitted to the driving wheels 4. Thus, under the engine mode, the power of the engine 1 is distributed to the first motor-generator 2 side and the drive gear 10 side through the power distribution device 5, and the torque distributed to the drive gear 10 side is further transmitted to the differential gear unit 16 though the counter shaft 12. On the other hand, the power distributed to the first motor-generator 2 side is once converted into an electric power and then converted into a mechanical power again by the second motor-generator 3, and delivered to the differential gear unit 16 through the counter driven gear 13, the counter shaft 12 and so on.

FIG. 8 is a nomographic diagram showing torques under the operating mode for propelling the vehicle using at least any one of the motor-generators 2 and 3. For example, under the single-motor mode, the second motor-generator 3 is rotated in the forward direction, and the torque thereof is delivered to the driving wheels 4 through the counter shaft 12 to propel the vehicle in the forward direction. In this situation, a rotation of the engine 1 is halted by bringing the brake Bcr into engagement to avoid a power loss resulting from rotating the engine 1 passively. Consequently, the first motor-generator 2 connected with the sun gear 6 is rotated in the backward direction. Therefore, an energy regeneration can be achieved while establishing a braking force by also operating the first motor-generator 2 as a motor during reducing the speed.

Under the single motor-mode, the torque in the forward direction can be applied to the ring gear 7 by rotating the first motor-generator 2 backwardly by delivering the electric power thereto the from the battery. The forward torque thus generated is added to the torque of the second motor-generator 3 and delivered to the driving wheels 4. In this situation, the vehicle is propelled by both of the motor-generators 2 and 3, that is, the vehicle is driven under the dual-motor mode.

As described, in the hybrid vehicle to which to the present invention is applied, the operating mode is selected from the engine mode, the single-motor mode and the dual motor mode, depending on the target power. The required driving force calculated based on an opening degree of the accelerator and a vehicle speed, or a predetermined coefficient calculated based on an opening degree of the accelerator and the required driving force may be employed as the target power. When the driving force is changed significantly to achieve a large required driving force, the operating mode may be shifted abruptly between the engine mode and the single-motor mode across the dual-motor mode. however, the control system according to the preferred example is configured to prevent such abrupt shifting of the operating mode over a plurality of stages.

Figure 1:
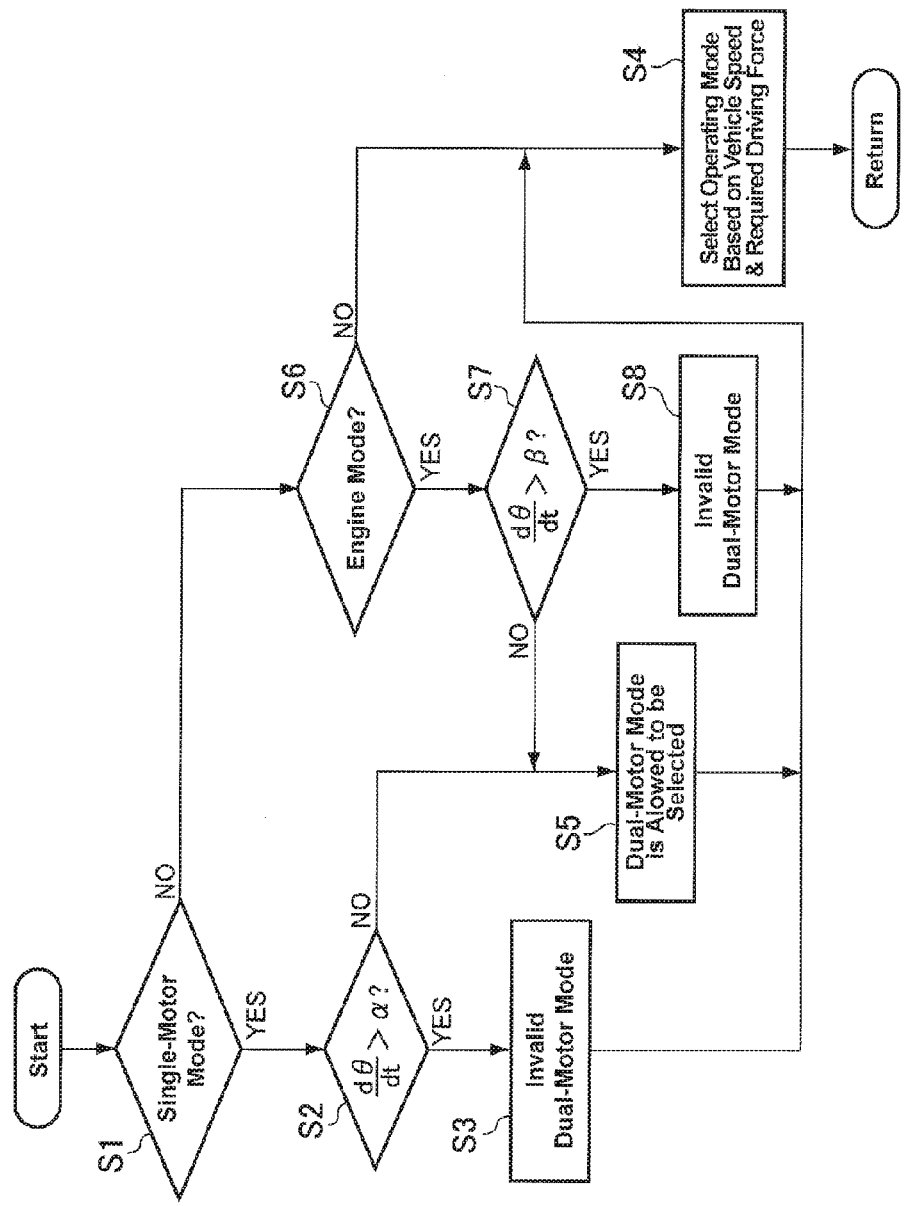
FIG. 1 is a flowchart showing a control example executed by the control system according to the present invention.

Referring now to FIG. 1, there is shown a flowchart of a preferred control example, and the HV-ECU 18 is configured to repeat the control example shown in FIG. 1 at predetermined short intervals, as long as the main switch of the hybrid vehicle is turned on. The control shown in FIG. 1 is configured to determine an existence of the interim mode between the current operating mode and the operating mode to be shifted in accordance with the current operating mode and the required driving force. To this end, according to the control example shown in FIG. 1, it is determined whether or not the single-motor mode is currently selected (at step S1). Specifically, such determination of step S1 is made based on a transmission of a command signal for selecting the single-motor mode from the HV-ECU 18. Alternatively, the determination of step S1 may also made based on the vehicle speed V and the required driving force F while with reference to the map shown in FIG. 4.

If the single-motor mode is selected so that the answer of step S1 is YES, it is determined whether or not a change rate of the required driving force is greater than a predetermined value (at step S2). According to the example shown in FIG. 1, specifically, it is determined whether or not a change rate of an opening degree of the accelerator $d\theta/dt$ is greater than a predetermined value $\alpha$. As described, the routine shown in FIG. 1 is repeated at predetermined intervals, and an opening degree of the accelerator is detected in each cycle. At step S2, therefore, it is also possible to compare a difference between opening degrees of the accelerator in each cycle (i.e., a change amount) with the predetermined value $\alpha$. That is, the predetermined value $\alpha$ is used to predict an occurrence of a shifting from the single-motor mode to the engine mode with reference to the map shown in FIG. 4. To this end, the predetermined value $\alpha$ may be determined in accordance with the vehicle speed based on an experimentation result.

A change in the operating point of the case in which the answer of step S2 is YES is indicated by the arrow "A" in FIG. 4. In this case, specifically, the operating mode is shifted from the single-motor mode to the engine mode across the dual-motor mode. In case a change rate (i.e., an increasing rate) $d\theta/dt$ of opening degree of the accelerator is greater than a predetermined value $\alpha$ so that the answer of step S2 is YES, the operating mode is thus abruptly shifted over a plurality of modes. In this case, in order to prevent the operating mode from being shifted across a plurality of modes, a selection of the dual-motor mode is invalidated (at step S3). Specifically, a command signal to select or establish the dual-motor mode is invalidated. Consequently, the operating mode is maintained to the single-motor mode or shifted directly to the engine mode even if the operating point enters into the dual-motor region II. In order not to select the dual-motor mode, for example, the dual-motor region II in FIG. 4 may be replaced by the single-motor region I or the engine region III.

After thus invalid the dual-motor mode at step S3, the operating mode is selected based on the vehicle speed V and the required driving force F (at step S4), and then the routine is returned. Thus, since the dual-motor mode is invalidated at step S3, the operating mode is shifted directly from the single-motor mode to the engine mode when the opening degree of the accelerator is increased abruptly.

Figure 2:
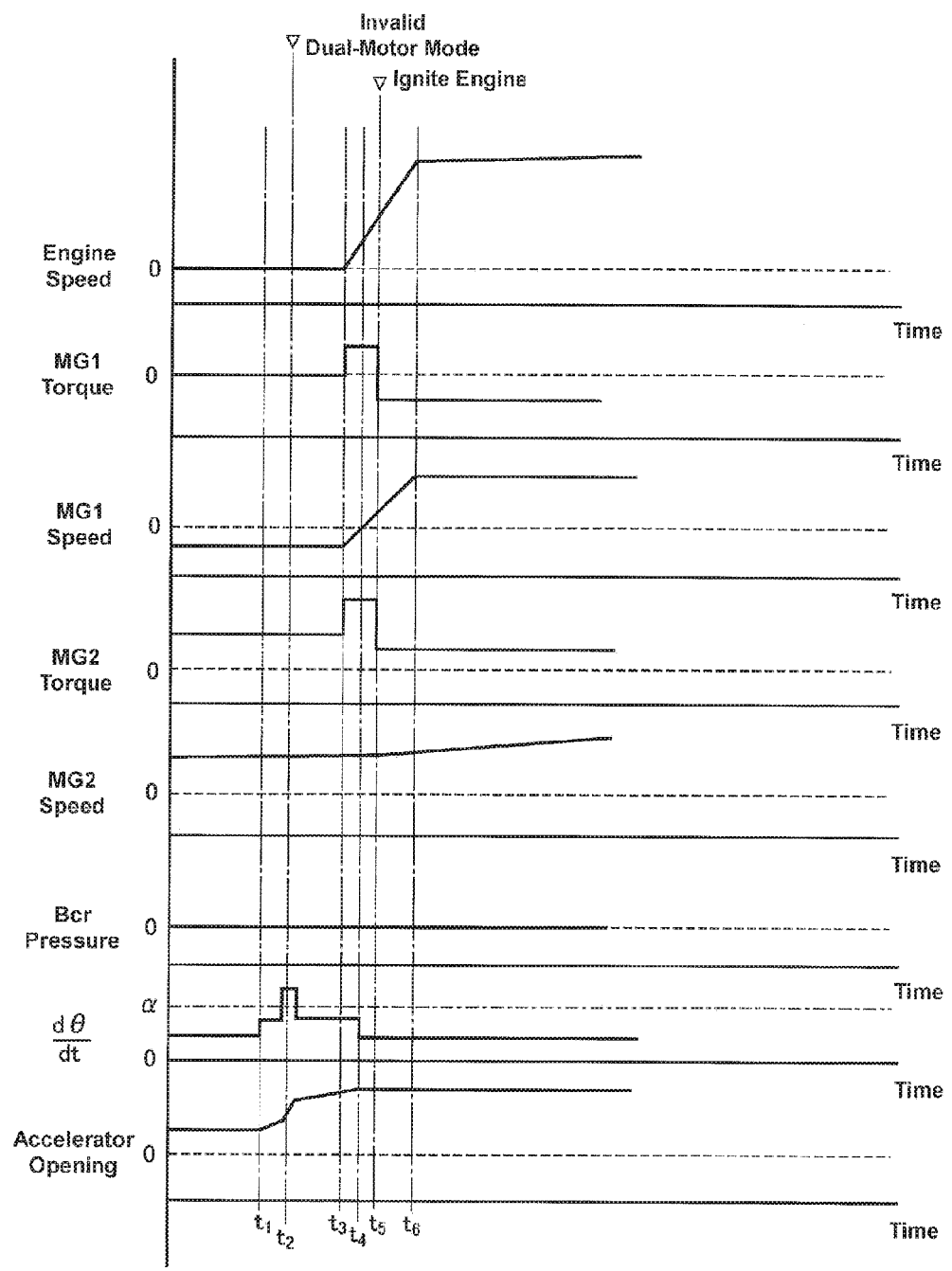
FIG. 2 is a time chart showing changes in speeds of the engine and the motor-generators and torques of the motor-generators during shifting the operating mode directly from the single-motor mode to the engine mode.

Turning to FIG. 2, there are shown changes in speeds and torques of the engine 1 and the motor-generators 2 and 3 during shifting the operating mode directly from the single-motor mode to the engine mode due to increase in the change rate $d\theta/dt$ of opening degree of the accelerator. Under the single-motor mode, the engine 1 is stopped, and a hydraulic pressure applied to the brake Bcr is reduced to "0" to bring the brake Bcr into disengagement. In this situation, the second motor-generator 3 generates a torque for propelling the vehicle, and the first motor-generator 2 is rotated freely without generating a torque. That is, the first motor-generator 2 is rotated in a reverse direction. When an opening degree of the accelerator is increased (at point t1), the change rate $d\theta/dt$ thereof is increased to be larger than "0". Then, when the accelerator pedal (not shown) is further depressed and hence the change rate $d\theta/dt$ exceeds the predetermined value $\alpha$, the condition to skip the dual-motor mode is satisfied (at point t2).

Then, a depressing speed of the accelerator pedal is reduced and hence the change rate $d\theta/dt$ falls below the predetermined value $\alpha$ and the required driving force is increased gradually. In this situation, even if the operating point of the vehicle enters into the dual-motor region II, the operating mode is prevented to be shifted to the dual-motor mode. Consequently, the hydraulic pressure applied to the brake Bcr is kept to "0" to maintain the brake Bcr into disengagement, and an output torque of the first motor-generator is also maintained to "0".

When the required driving force F is increased with an increase in the opening degree of the accelerator so that the operating point enters into the engine region III (at point t3), an output torque of the first motor-generator 2 is increased in the forward direction (i.e., in the direction to rotate the engine 1) to start the engine 1. Consequently, speed of the first motor-generator 2 starts increasing in the forward direction. In this situation, an output torque of the second motor-generator 3 is increased to prevent a reduction in the drive torque caused by cranking the engine 1. The accelerator pedal being depressed to increase the engine speed is maintained to a predetermined degree (at point t4), and consequently the change rate $d\theta/dt$ is reduced to "0". Then, the engine 1 is ignited (to be activated) when the rotational speed thereof is sufficiently raised (at point t5). Consequently, the engine 1 starts generating a torque and hence the output torque of the second motor-generator 3 is reduced. In this situation, a speed of the second motor-generator 3 is increased with an increase in the vehicle speed. Meanwhile, the first motor-generator 2 is operated as a generator to adjust the engine speed in an optimally fuel efficient manner. That is, the first motor-generator established a negative torque. Then, when the startup of the engine 1 is completed, speeds of the engine 1 and the first motor-generator 2 are maintained in accordance with an opening degree of the accelerator or a required driving force F (at point t6).

Thus, the control system according to the preferred example shift the operating mode directly from the single-motor mode to the engine mode while skipping the dual-motor mode if the change rate $d\theta/dt$ of the opening degree of the accelerator is greater than the predetermined value $\alpha$. For this reason, it is unnecessary to generate the driving force by the first motor-generator 2, and to bring the brake Bcr into engagement and disengagement. That is, the operating mode can be prevented from being shifted abruptly and frequently. In addition, although the single-motor mode is maintained even when the opening degree of the accelerator is increased in case of thus skipping the dual-motor mode, the operating mode can be shifted promptly to the engine mode with an increase in the change rate $d\theta/dt$ of the opening degree of the accelerator. For this reason, the driving force can be increased without delay so that discomfort can be reduced.

If the answer of step S2 is NO, this means that the opening degree of the accelerator is not being changed or changed slowly. In this case, there is sufficient time is available to establish the dual-motor mode during the shifting between the single-motor mode and the engine mode in either direction. That is, the shifting operation between the single-motor mode and the engine mode will not become busy even if the dual-motor mode is established transitionally. In this case, therefore, the dual-motor mode is allowed to be selected (at step S5). Then, the routine advances to step S4 to select the operating mode based on the vehicle speed V and the required driving force F and returned.

If the single-motor mode is not currently selected so that the answer of step S1 is NO, it is it is determined whether or not the engine mode is currently selected (at step S6). As the determination of step S1, the determination of step S6 may also be made based on a transmission of a command signal for selecting the engine mode from the HV-ECU 18, or based on the vehicle speed V and the required driving force F while with reference to the map shown in FIG. 4. If the answer of step S6 is NO, this means that the dual-motor mode is currently selected. In this case, the routine also advances to step S4 to select the operating mode based on the vehicle speed V and the required driving force F, and returned.

By contrast, if the engine mode is currently selected so that the answer of step S1 is YES, it is determined whether or not the change rate of the required driving force is greater than another predetermined value (at step S7). In this case, specifically, it is determined whether or not a change rate $d\theta/dt$ of an opening degree of the accelerator is greater than a predetermined value $\beta$. As described, the routine shown in FIG. 1 is repeated at predetermined intervals, and an opening degree of the accelerator is detected in each cycle. At step S2, therefore, it is also possible to compare a difference between opening degrees of the accelerator in each cycle (i.e., a change amount) with the predetermined value $\beta$. That is, the predetermined value $\beta$ is used to predict an occurrence of a shifting from the engine mode to the single-motor mode with reference to the map shown in FIG. 4. To this end, specifically, a reduction rate of the opening degree of the accelerator is determined at step S7.

A change in the operating point of the case in which the answer of step S7 is YES is indicated by the arrow "B" in FIG. 4. In this case, specifically, the operating mode is shifted from the engine mode to the single-motor mode across the dual-motor mode. In case a change rate (i.e., a reduction rate) $d\theta/dt$ of opening degree of the accelerator is greater than a predetermined value $\beta$ so that the answer of step S7 is YES, the operating mode is thus abruptly shifted over a plurality of modes. In this case, in order to prevent the operating mode from being shifted across a plurality of modes, a selection of the dual-motor mode is also invalidated (at step S8). Specifically, the control similar to step S3 is carried out.

After thus invalid the dual-motor mode at step S8, the routine also advances to step S4 to select the operating mode based on the vehicle speed V and the required driving force F and then is returned. Thus, since the dual-motor mode is invalidated at step S8, the operating mode is shifted directly from the engine mode to the single-motor mode when the opening degree of the accelerator is reduced abruptly.

In this case, the operating mode is shifted directly from the engine mode to the single-motor mode by stopping a fuel supply to the engine 1 to turn off the engine 1 while keeping the brake Bcr into disengagement. In addition, a torque of the first motor-generator 2 is reduced to "0" while allowing the first motor-generator 2 to rotate freely, and an output torque of the second motor-generator 3 is increased to achieve the required driving force. Thus, when the change rate $d\theta/dt$ is greater than the predetermined value $\beta$, the operating mode is shifted directly from the engine mode to the single-motor mode while skipping the dual-motor mode. For this reason, it is unnecessary to generate the driving force by the first motor-generator 2, and to bring the brake Bcr into engagement and disengagement. That is, the operating mode can be prevented from being shifted abruptly and frequently. In addition, although the operating mode is maintained to the engine mode without being shifted to the dual-motor mode even if the opening degree of the accelerator is reduced with the reduction rate greater than the predetermined value, the vehicle is allowed to coast without generating torque by the engine 1 so that the driving force can be reduced promptly without delay. In this case, therefore, the operating mode can be shifted promptly to the single-motor mode so that the fuel can be prevented from being wasted.

If the answer of step S7 is NO, this means that the opening degree of the accelerator is not being changed or changed slowly. In this case, there is sufficient time is available to establish the dual-motor mode during the shifting between the engine mode and the single-motor mode in either direction. That is, the shifting operation between the engine mode and the single-motor mode will not become busy even if the dual-motor mode is established transitionally. In this case, therefore, the routine advances to step S5 to allow the dual-motor mode to be selected. Then, the routine advances to step S4 to select the operating mode based on the vehicle speed V and the required driving force F and returned.

If the dual-motor mode is currently selected so that the answer of step S6 is NO, the routine advances directly to step S4 to select the operating mode based on the vehicle speed V and the required driving force F and then returned.

Figure 9:
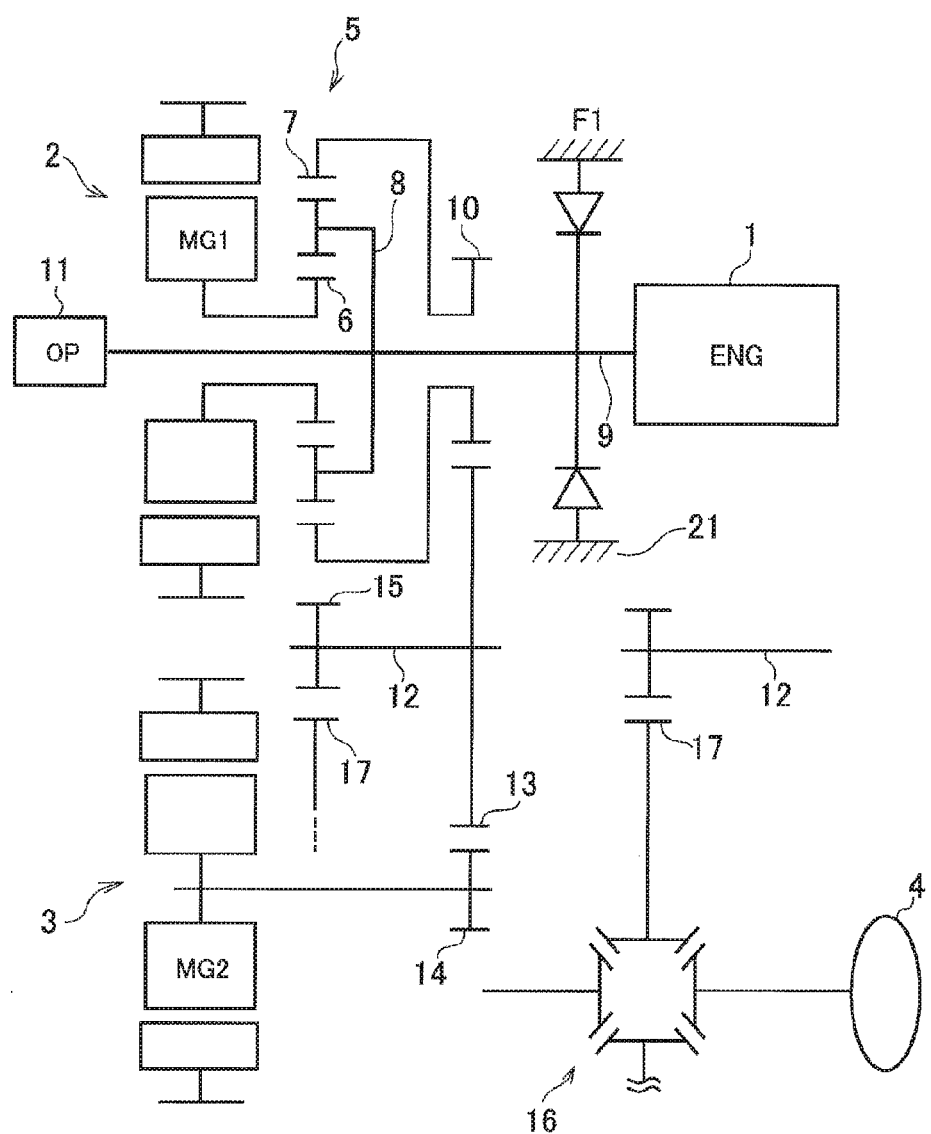
FIG. 9 is a skeleton diagram showing a modified example of the powertrain shown in FIG. 5 in which a one-way clutch is used instead of a brake.

The control system of the preferred example may also be applied to a powertrain of a hybrid vehicle other than that shown in FIG. 5. A partial modification example of the powertrain to which the control system is applied is shown in FIG. 9. In the powertrain shown in FIG. 9, a one-way clutch F1 is used instead of the brake Bcr. Specifically, the one-way clutch F1 is disposed between the output shaft 9 or the carrier 8 and a stationary member 21 such as a housing, and adapted to be brought into engagement when the output shaft 9 or the carrier 8 is rotated in the counter direction to stop rotation thereof. Thus, rotation of the output shaft 9 or the carrier 8 in the counter direction can be halted by the one-way clutch F1. In this case, therefore, the engagement device such as the brake does not have to be controlled during propelling the vehicle by the motor-generators 2 and 3 under the EV mode.

Figure 10:
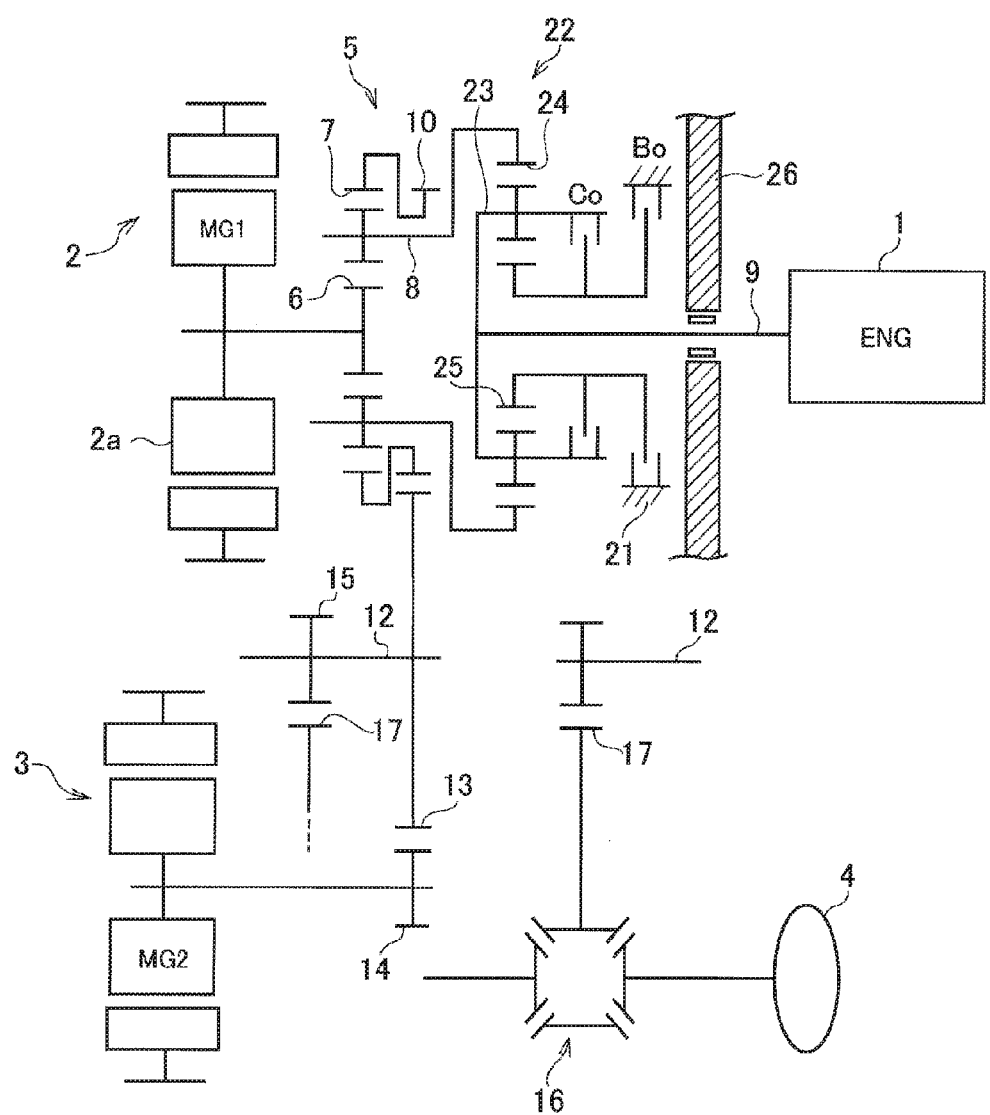
FIG. 10 is a skeleton diagram showing an example of the powertrain in which a transmission is disposed between the engine and the power distribution device.
Figure 11:
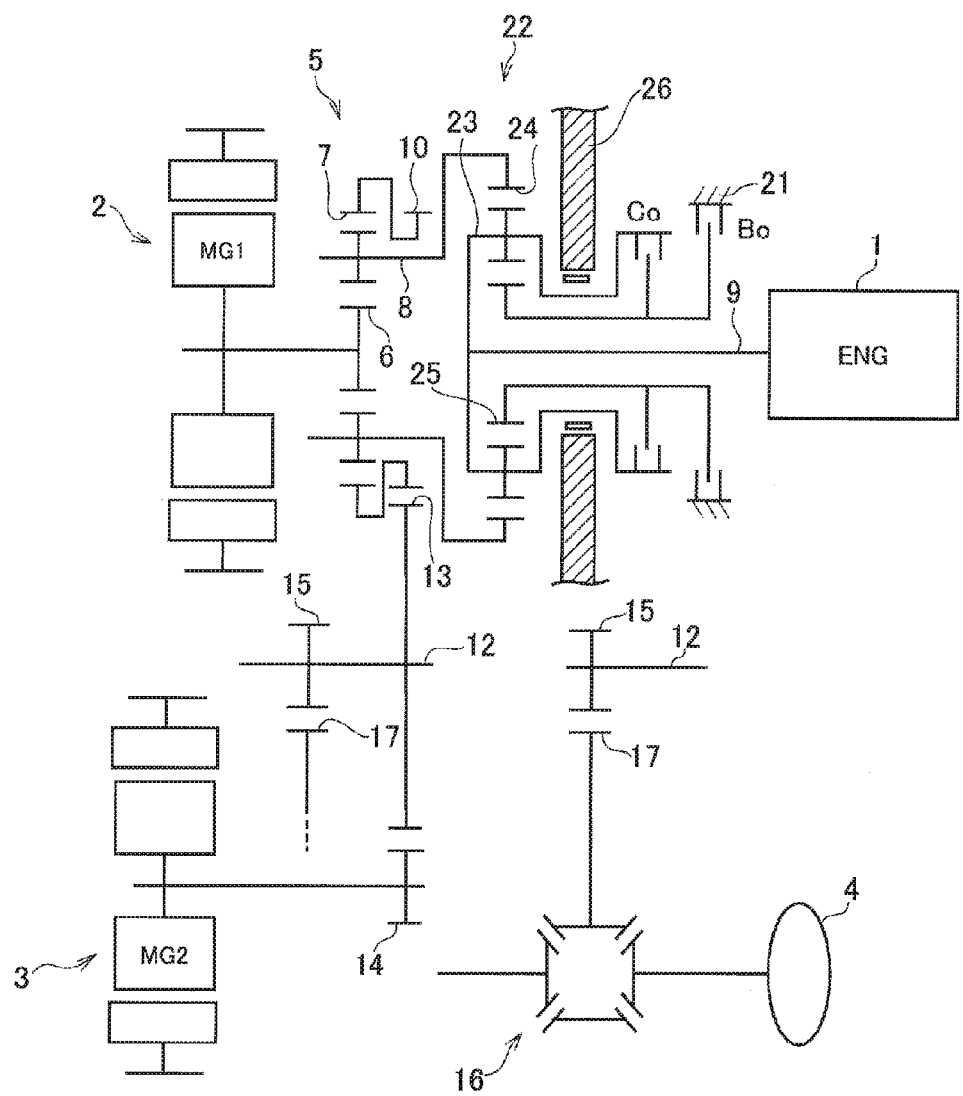
FIG. 11 is a skeleton diagram showing a modified example of the powertrain shown in FIG. 10 in which a position of a bulkhead is altered.

Turning to FIG. 10, there is shown an example in which a transmission 22 is interposed between the engine 1 and the power distribution device 5. The transmission 22 comprises a single-pinion planetary gear unit, and adapted to shift a gear stage between a direct drive stage (i.e., a low stage) and a speed increasing stage (i.e., an overdrive stage (O/D) or a high stage). In the transmission 22, a carrier 23 is connected to the output shaft 9 of the engine 1, and a ring gear 24 is connected to the carrier 8 of the power distribution device 5 to be rotated integrally therewith. In this example, a clutch C0 is disposed between a sun gear 25 and the carrier 23 to connect those elements selectively, and a brake B0 is disposed to halt the sun gear 25 selectively. For example, a hydraulically engaged frictional engagement device may be employed as each of the clutch C0 and brake B0. In the example shown in FIG. 10, in order to simplify a structure of the powertrain, the clutch C0 and brake B0 may be situated in the vicinity of a bulkhead 26 having an internal oil passage for delivering and draining oil to/from the clutch C0 and brake B0. Alternatively, the bulkhead 26 may also be disposed between the single-pinion planetary gear unit, and the clutch C0 and brake B0 as illustrated in FIG. 11. In this case, no significant modification is required in the conventional powertrain of the hybrid drive unit and hence the power train shown in FIG. 11 can be manufactured or assembled easily.

In the transmission 22, the direct drive stage (i.e., the low stage) is established by bringing the clutch C0 into engagement to connect the sun gear 25 and the carrier 23, and under the direct drive stage, the planetary gear unit is rotated integrally so that the torque is transmitted without increasing or decreasing the speed. In this situation, the transmission 22 is halted entirely by additionally bringing the brake B0 into engagement so that rotations of the carrier 8 of the power distribution device 5 and the engine 1 are stopped. By contrast, the sun gear 25 serves as a fixing element and the carrier 23 serves as an input element given that only the brake B0 is in engagement. In this situation, the ring gear 24 serves as an output element and rotated in the same direction as the carrier 23 at a speed higher than that of the carrier 23. Consequently, the transmission 22 serves as a speed increasing device, that is, the O/D stage (i.e., the high stage) is established. Under the O/D stage, the torque of the engine 1 is applied to the carrier 8 while being decreased in accordance with a speed ratio of the transmission 22, and hence the torque generated by the first motor-generator 2 can be reduced in comparison with the examples shown in FIGS. 5 and 9. Additionally, although the transmission 22 is disposed in an upstream side of the power distribution device 5 in the examples shown in FIGS. 10 and 11, the remaining strictures in the downstream side of the power distribution device 5 (i.e., the driving wheel 4 side) are similar to those of the examples shown in FIGS. 5 and 9. Therefore, the single-motor mode and the dual-motor mode may also be established in the examples shown in FIGS. 10 and 11.

Figures 12, 13:
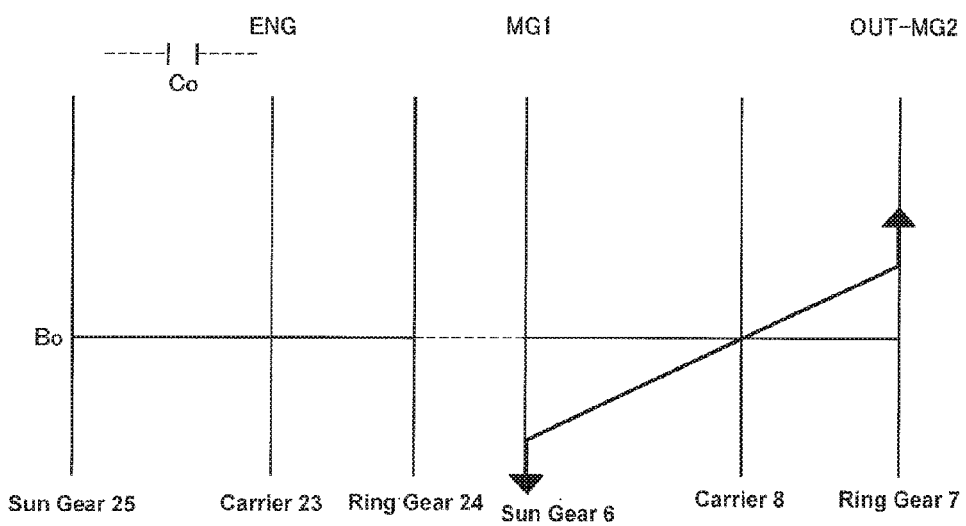
FIG. 12 is a table showing engagement states of the clutch and the brake and operating states of the motor-generators under each operating mode of the powertrains shown in FIGS. 10 and 11.
FIG. 13 is a nomographic diagram showing states of the power distribution device and the transmission unit of the power trains shown in FIGS. 10 and 11 under a condition that the vehicle is powered by the engine.

Statuses of the clutch C0, the brake B0 and the motor-generators 2 and 3 under each driving mode are shown in FIG. 12. In FIG. 12, "EV" represents the motor mode. As can be seen from FIG. 12, under the single-motor mode, both of the clutch C0 and the brake B0 are brought into disengagement, the first motor-generator 2 serves as a generator, and the second motor-generator 3 serves as a motor. In this situation, the first motor-generator 2 may also be idled. Under the single-motor mode, an engine braking can be applied by bringing both of the clutch C0 and the brake B0 into engagement to halt the carrier 8 of the power distribution device 5.

In turn, under the dual-motor mode, both of the motor-generators 2 and 3 are operated as motors. In this case, both of the clutch C0 and the brake B0 are brought into engagement to halt the carrier 8 of the power distribution device 5 thereby delivering the torque of the first motor-generator 2 from the drive gear 10 to the counter driven gear 13. That is, as shown in FIG. 13, the power distribution device 5 serves as a speed reducing device, and the torque of the first motor-generator 2 is delivered from the drive gear 10 to the counter driven gear 13 while being amplified.

Figure 14:
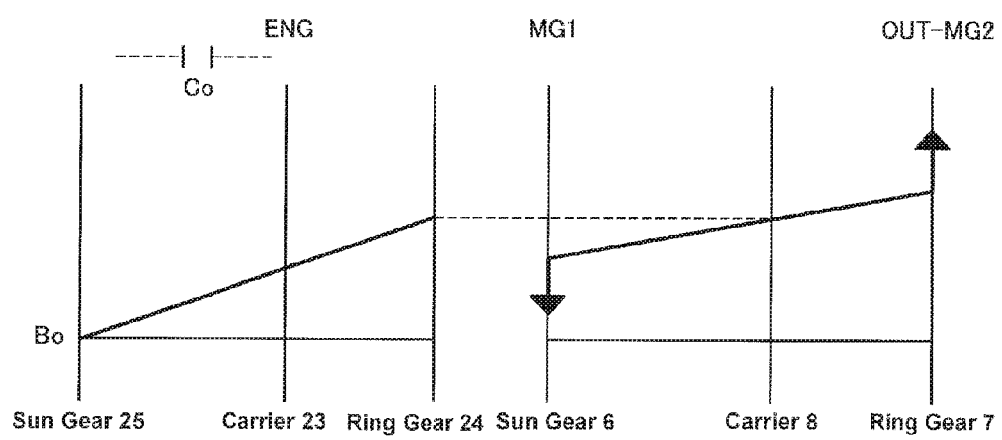
FIG. 14 is a nomographic diagram showing states of the power distribution device and the transmission unit of the power trains shown in FIGS. 10 and 11 under a condition that the vehicle is powered by the motor-generator.

Meanwhile, in FIG. 12, "HV" represents the hybrid mode where the engine is operated. Given that the vehicle runs at a medium to high speed under the HV mode, the O/D stage is established in the transmission 22 by bringing the clutch C0 into disengagement while bringing the brake B0 into engagement as shown in FIG. 14. As described, the rotational speed of the engine 1 is controlled by the first motor-generator 2 in an optimally fuel efficient manner. In this situation, the first motor-generator 2 serves as a generator, and the second motor-generator 3 is driven as a motor to generate a driving force by the electric power generated by the first motor-generator 2. By contrast, when a large driving force is required, for example, when the vehicle speed is low and an opening degree of the accelerator is large, the direct drive stage (i.e., the low stage) is established in the transmission 22 by bringing the clutch C0 into engagement while bringing the brake B0 into disengagement, and the transmission 22 is rotated integrally. In this situation, the first motor-generator 2 remains as a generator and the second motor-generator 3 remains as a generator. In case of propelling the vehicle in the backward direction by operating the engine 1, the direct drive stage (i.e., the low stage) is also established in the transmission 22 while operating the first motor-generator 2 as a generator and the second motor-generator 3 as a motor. In this situation, the driving wheels 4 are rotated in the backward direction by controlling rotational directions and speeds of the motor-generators 2 and 3.

The invention claimed is:

1. A control system for a hybrid vehicle in which a prime mover for generating a driving force to propel the vehicle includes an engine and at least two motors, that is configured to select an operating mode of the vehicle in accordance with a required driving force from:
   a first operating mode in which the vehicle is powered by the engine,
   a second operating mode in which the vehicle is powered by at least two motors, and
   a third operating mode in which the vehicle is powered by a smaller number of motors than that under the second operating mode,
   wherein the control system is configured to invalidate selection of the second operating mode and to remain in either the first operating mode or the third operating mode thereby avoiding operating mode shifting across two modes, one of the two modes being an interim mode, if a change rate of the required driving force is greater than a predetermined value.

2. The control system for a hybrid vehicle as claimed in claim 1, wherein the required driving force is calculated based on an opening degree of an accelerator and a vehicle speed.

3. The control system for a hybrid vehicle as claimed in claim 1, wherein the change rate of the required driving force includes a change rate of the opening degree of the accelerator.

4. The control system for a hybrid vehicle as claimed in claim 1, wherein the control system is further configured to:
   define an operating region of the vehicle based on the required driving force and the vehicle speed into a first region where the first operating mode is selected, a second region where the required driving force is smaller than that within the first region and hence the second operating mode is selected, and a third region where the required driving force is smaller than that within the second region and hence the third operating mode is selected; and
   select the operating mode from the first region to the third region upon entrance of an operating point of the vehicle determined based on the required driving force and the vehicle speed.

5. The control system for a hybrid vehicle as claimed in claim 4, wherein the control system is further configured to select the first operating mode even if the operating point enters into the second region by expanding the first region to cover the second region.

6. The control system for a hybrid vehicle as claimed in claim 4, wherein the control system is further configured to select the first operating mode instead of the second operating mode even if the operating point enters into the second region.

7. The control system for a hybrid vehicle as claimed in claim 1, wherein said two motors includes:
   a first motor adapted to deliver a driving force to the engine and driving wheels; and
   a second motor adapted to deliver a driving force at least to the driving wheels.

8. The control system for a hybrid vehicle as claimed in claim 5, wherein the hybrid vehicle comprises:
   a power distribution device adapted to perform a differential action among first to third rotary elements, in which a first rotary element is connected to the engine, a second rotary member is connected to the first motor, and a third rotary member is connected to the second motor; and
   a halting means that halts and releases the first rotary element.

9. The control system for a hybrid vehicle as claimed in claim 1, wherein one of the motors includes a motor having a generating function.

* * * * *